United States Patent
Yen et al.

(10) Patent No.: US 10,499,156 B2
(45) Date of Patent: Dec. 3, 2019

(54) METHOD AND DEVICE OF OPTIMIZING SOUND SIGNAL

(71) Applicant: Xiaomi Inc., Beijing (CN)

(72) Inventors: Chiafu Yen, Beijing (CN); Nannan Wang, Beijing (CN); Peng Zhang, Beijing (CN); Liujun Zhang, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 15/057,639

(22) Filed: Mar. 1, 2016

(65) Prior Publication Data

US 2016/0330548 A1 Nov. 10, 2016

(30) Foreign Application Priority Data

May 6, 2015 (CN) .......................... 2015 1 0226844

(51) Int. Cl.
 *H04R 5/04* (2006.01)
 *H04R 1/40* (2006.01)
 (Continued)

(52) U.S. Cl.
 CPC .............. *H04R 5/04* (2013.01); *H04R 1/406* (2013.01); *H04R 3/005* (2013.01); *H04R 29/007* (2013.01);
 (Continued)

(58) Field of Classification Search
 CPC .......... H04R 2430/01; H04R 2227/007; H04R 29/007; H04R 3/005; H04R 5/04;
 (Continued)

(56) References Cited

U.S. PATENT DOCUMENTS 4,864,627 A * 9/1989 Dugan ...................... H03G 7/00
 381/106
6,001,131 A * 12/1999 Raman ................. G10L 21/0208
 704/226
(Continued)

FOREIGN PATENT DOCUMENTS

CN 1386371 A 12/2002
CN 101236250 A 8/2008
(Continued)

OTHER PUBLICATIONS

International Search Report dated Feb. 14, 2016 for International Application No. PCT/CN2015/090275, 5 pages.
(Continued)

*Primary Examiner* — Davetta W Goins
*Assistant Examiner* — Kuassi A Ganmavo
(74) *Attorney, Agent, or Firm* — Arch & Lake LLP (57) ABSTRACT

A method and a device are provided for optimizing a sound signal in the field of voice signal processing. The device includes at least two sound collecting units. In the method, the device locates one or more sound sources via the at least two sound collecting units. The device selects a designated sound source among the one or more sound sources. The device determines a sound signal emitted from the designated sound source among sound signals collected by the sound collecting units according to a spatial position of the designated sound source. The device optimizes the sound signal emitted from the designated sound source.

18 Claims, 5 Drawing Sheets

(51) Int. Cl.
  *H04R 3/00* (2006.01)
  *H04R 29/00* (2006.01)
  *H04N 7/15* (2006.01)
  *H04M 3/56* (2006.01)
(52) U.S. Cl.
  CPC ............... *H04M 3/568* (2013.01); *H04N 7/15* (2013.01); *H04R 2227/007* (2013.01); *H04R 2430/01* (2013.01); *H04R 2430/20* (2013.01); *H04R 2499/11* (2013.01); *H04S 2400/15* (2013.01)
(58) Field of Classification Search
  CPC ............... H04R 1/406; H04R 2499/11; H04R 2430/20; H04S 2400/15
  See application file for complete search history.

(56) References Cited

U.S. PATENT DOCUMENTS

| | | | | |
|---|---|---|---|---|
| 8,243,961 | B1* | 8/2012 | Morrill | H04M 1/6041 379/433.03 |
| 2002/0114474 | A1* | 8/2002 | Finn | H04S 1/007 381/111 |
| 2007/0230712 | A1* | 10/2007 | Belt | G10L 21/0208 381/71.1 |
| 2007/0262819 | A1* | 11/2007 | Jin | H03G 3/32 330/278 |
| 2008/0033723 | A1* | 2/2008 | Jang | G10L 25/78 704/254 |
| 2008/0269926 | A1* | 10/2008 | Xiang | H03G 3/32 700/94 |
| 2011/0013075 | A1* | 1/2011 | Kim | H04N 5/602 348/370 |
| 2011/0158425 | A1* | 6/2011 | Hayakawa | G01S 3/8083 381/92 |
| 2011/0216093 | A1* | 9/2011 | Griffin | H04R 3/12 345/659 |
| 2011/0288864 | A1* | 11/2011 | Kechichian | G10L 25/78 704/237 |
| 2012/0069134 | A1 | 3/2012 | Garcia, Jr. et al. | |
| 2012/0128175 | A1* | 5/2012 | Visser | H04R 3/005 381/92 |
| 2012/0303363 | A1 | 11/2012 | Sorensen | |
| 2013/0142361 | A1* | 6/2013 | Lim | H03G 3/3005 381/107 |
| 2013/0316691 | A1 | 11/2013 | Forutanpour et al. | |
| 2013/0332156 | A1* | 12/2013 | Tackin | H04M 1/6041 704/226 |
| 2014/0010377 | A1 | 1/2014 | Hsu et al. | |
| 2014/0254823 | A1 | 9/2014 | Yan et al. | |
| 2014/0270202 | A1* | 9/2014 | Ivanov | H04R 29/005 381/58 |
| 2014/0270217 | A1* | 9/2014 | Ivanov | H04R 29/005 381/66 |
| 2014/0294183 | A1* | 10/2014 | Lee | H04R 3/005 381/56 |
| 2015/0031419 | A1* | 1/2015 | Zhang | H04M 1/6041 455/569.1 |
| 2015/0142454 | A1* | 5/2015 | Ojanpera | H04S 7/30 704/500 |
| 2017/0309293 | A1* | 10/2017 | Lee | G10L 21/0232 |

FOREIGN PATENT DOCUMENTS

| | | |
|---|---|---|
| CN | 101455093 A | 6/2009 |
| CN | 101510426 A | 8/2009 |
| CN | 102164328 A | 8/2011 |
| CN | 102685339 A | 9/2012 |
| CN | 103390410 A | 11/2013 |
| CN | 103873977 A | 6/2014 |
| CN | 104053107 A1 * | 6/2014 |
| CN | 104053107 A | 9/2014 |
| JP | 63-262576 A | 10/1988 |
| JP | 09-046400 A | 2/1997 |
| JP | H09252333 A | 9/1997 |
| JP | 2008048342 A | 2/2008 |
| JP | 2010206298 A | 9/2010 |
| JP | 2011066805 A | 3/2011 |
| JP | 2011-077649 A | 4/2011 |
| JP | 2011-091658 A | 6/2011 |
| JP | 2013168878 A * | 8/2013 |
| KR | 10-2010-0044991 | 5/2010 |
| KR | 10-2011-0019162 | 2/2011 |
| RU | 2312405 C2 | 12/2007 |
| RU | 2461144 C2 | 9/2012 |
| RU | 2483365 C2 | 5/2013 |
| WO | 2012/078111 A1 | 6/2012 |
| WO | WO 2015117919 A1 * | 8/2015 ............ G06F 3/165 |

OTHER PUBLICATIONS

Office Action issued in corresponding Korean Application No. 10-2015-7031849 with English translation, dated Sep. 29, 2016, 7 pages.
Extended European Search Report issued in corresponding European Application No. 16166152.5 dated Sep. 29, 2016, 11 pages.
English translation of International Search Report issued in corresponding PCT Application No. PCT/CN2015/090275, dated Feb. 14, 2016, 3 pages.
Office Action (including English translation) issued in corresponding Russian Patent Application No. 2015155321/08 (085355), dated Mar. 28, 2017, 11 pages.
Office Action for Japanese patent application No. 2017-516025 dated Jun. 27, 2017, 4 pages.
Communication pursuant to Article 94(3) EPC, European Application No. 16166152.5, dated Jan. 2, 2018, 8 pages.
Paulose et al., "Acoustic Source Localization", International Journal of Advanced Research in Electrical, Electronics and Instrumentation Engineering, vol. 2, Issue 2, Feb. 2013, 7 pages.
Kunin et al., "Direction of Arrival Estimation and Localization Using Acoustic Sensor Arrays", Journal of Sensor Technology, 2011, 1, 71-80.
Second Office Action issued in corresponding Chinese Application No. 201510226844.2 dated Mar. 26, 2018, 6 pages.
Summons to attend proceedings pursuant to Rule 115(1) EPC issued in corresponding European Application No. 16166152.5, dated Dec. 6, 2018, 11 pages.

* cited by examiner

METHOD AND DEVICE OF OPTIMIZING SOUND SIGNAL

CROSS-REFERENCE TO RELATED APPLICATIONS

This application is based upon and claims priority to Chinese Patent Application No. 201510226844.2, filed May 6, 2015, the entire contents of which are incorporated herein by reference.

TECHNICAL FIELD

The present disclosure relates to the field of voice signal processing and, more particularly, to a method and a device of optimizing a sound signal.

BACKGROUND

With a continuous development of communication and electronic technology, terminals supporting voice communication or sound recording function, such as a smartphone, a tablet, an e-book reader, and an electronic recording pen, gradually become indispensable tools in people's life, and offer great conveniences for people's daily life.

In one application manner of such terminals, multiple users may use the same terminal supporting the sound recording function to record sound during conference, or multiple users may use the same terminal supporting the voice communication to perform a teleconferencing with other users on the remote end; then the terminal stores the recorded sound signal, or sends the voice communication to the users on the remote end.

SUMMARY

The present disclosure provides a method and a device of optimizing a sound signal. The technical solutions are as follows.

According to a first aspect, a method is provided for optimizing a sound signal. The method may be implemented in a terminal including at least two sound collecting units. The method includes: locating one or more sound sources around the terminal via the at least two sound collecting units; selecting a designated sound source among the one or more sound sources; determining a sound signal emitted from the designated sound source among sound signals collected by the terminal according to a spatial position of the designated sound source acquired by the locating; and optimizing the sound signal emitted from the designated sound source.

According to a second aspect, a device is provided for optimizing a sound signal. The device includes: a processor electronically connected to at least two sound collecting units; and a memory for storing instructions executable by the processor. The processor is configured to locate one or more sound sources via the at least two sound collecting units. The processor is configured to select a designated sound source among the one or more sound sources. The processor is configured to determine a sound signal emitted from the designated sound source among sound signals collected by the sound collecting units according to a spatial position of the designated sound source acquired by the locating. The processor is configured to optimize the sound signal emitted from the designated sound source.

According to a third aspect, there is provided a non-transitory readable storage medium including instructions. The instructions are executable by a processor in a terminal for performing acts to optimize a sound signal. The acts include: locating one or more sound sources via the at least two sound collecting units; selecting a designated sound source among the one or more sound sources; determining a sound signal emitted from the designated sound source among sound signals collected by the sound collecting units according to a spatial position of the designated sound source acquired by the locating; and optimizing the sound signal emitted from the designated sound source.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

The solutions provided by embodiments of the present disclosure may, in part, include the following advantageous effects. By locating one or more sound sources around the terminal via the at least two sound collecting units, selecting a designated sound source among the one or more sound sources determined by the locating, determining a sound signal emitted from the designated sound source among sound signals collected by the terminal according to a spatial position of the designated sound source acquired by the locating, and optimizing the sound signal emitted from the designated sound source, the terminal improves the signal quality from the desired sound source. Thus, when collecting sound signals, the terminal screens out the surrounding sound sources and optimizes the sound signal emitted from the screened sound source, the effect of collecting the sound signal by the terminal is improved.

Figure 1:
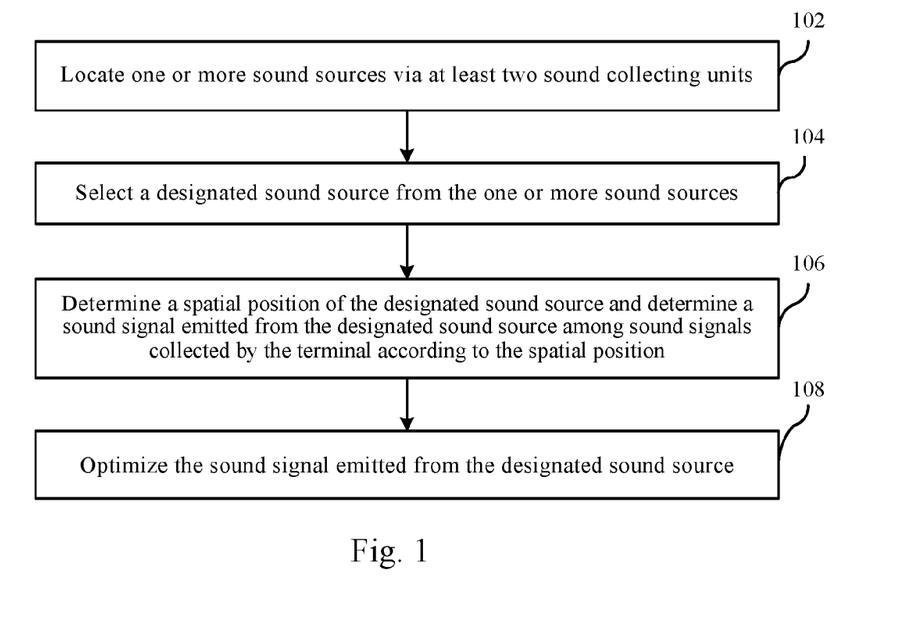
FIG. 1 is an example flow chart of a method of optimizing a sound signal, according to one exemplary embodiment of the present disclosure.

FIG. 1 is an example flow chart of a method of optimizing a sound signal, according to one exemplary embodiment of the present disclosure. The method of optimizing a sound signal may be implemented at least partially in a terminal including at least two sound collecting units, and the terminal may be a smart terminal supporting voice communication or a sound recording function, such as a smartphone, a tablet, an e-book reader, or a smart recording pen. As shown in FIG. 1, the method of optimizing a sound signal may include the following steps.

In step 102, the terminal locate one or more sound sources via the at least two sound collecting units. The sound sources may be around the terminal. For example, the sound sources may include a user of the terminal who is speaking, a background noise from vehicles passing by, background music from a media player, and etc.

In step 104, a designated sound source is selected from one or more sound sources determined by the locating. The terminal may select the designated sound source based on one or more factors including: an intensity of each sound signal, a continuity of each sound signal, and/or other character of each sound signal from the one or more sound sources.

In step 106, the terminal determines a spatial position of the designated sound source and determines a sound signal emitted from the designated sound source among sound signals collected by the terminal according to the spatial position. For example, a sound signal from a person using the terminal is determined from sound signals collected by the terminal according to a spatial position of the person.

In step 108, the terminal optimizes the sound signal emitted from the designated sound source. The terminal may optimize a volume of the sound signal.

For example, the optimizing the sound signal emitted from the designated sound source includes following. The terminal may compare an intensity of the sound signal emitted from the designated sound source with a predetermined first intensity threshold and a predetermined second intensity threshold, where the first intensity threshold is greater than or equal to the second intensity threshold. When the intensity of the sound signal emitted from the designated sound source is greater than the first intensity threshold, the terminal may decrease the intensity of the sound signal emitted from the designated sound source to the first intensity threshold. When the intensity of the sound signal emitted from the designated sound source is smaller than the second intensity threshold, the terminal may increase the intensity of the sound signal emitted from the designated sound source to the second intensity threshold.

To locate sound sources around the terminal via the at least two sound collecting units, the terminal may acquire a time difference and a phase difference of sound signals received at the at least two sound collecting units, where the sound signals are emitted by a sound source. The terminal may determine the spatial position of the sound source with respect to the terminal according to the time difference and the phase difference of the sound signal emitted by the sound source arriving at the at least two sound collecting units.

Alternatively or additionally, the selecting the designated sound source among one or more sound sources determined by the locating includes: selecting the designated sound source among one or more sound sources according to an intensity and/or a continuity of each of the sound signals from the one or more sound sources.

Alternatively or additionally, before determining the sound signal emitted from the designated sound source among the sound signals collected by the terminal, the terminal may acquire an attitude of the terminal via one or more attitude sensors in the terminal; and perform a gain compensation on the sound signals collected by the terminal according to the attitude of the terminal. The terminal may then determine the sound signal emitted from the designated sound source among the sound signals having undergone the gain compensation.

For example, the attitude of the terminal may indicate the orientation of the terminal relative to Earth's horizon. The attitude may include following information: an angle between a front surface of the terminal and a horizontal plane; which surface of the terminal is facing up; a velocity of the terminal. The terminal may determine whether the terminal is moving within a vehicle, a train, or other transportation machine using the velocity information. The front surface may include the at least two sound collecting units. Alternatively, the front surface may be parallel to the plane that include the at least two sound collecting units. Using the attitude information, the terminal may identify specific background noise and the desired sound signal from the designated sound source. Thus, the terminal may perform gain compensation on the desired sound signal and suppress or remove the identified background noise at the same time.

The terminal performs the gain compensation on the sound signals collected by the terminal according to the attitude of the terminal includes: determining a compensation value according to the angle between the front surface of the terminal and the horizontal plane, the angle between the front surface of the terminal and the horizontal plane being in direct proportion to the compensation value; and performing the gain compensation on the sound signals collected by the terminal according to the compensation value.

Accordingly, the terminal optimizes a sound signal by locating sound sources around the terminal via at least two sound collecting units, selecting a designated sound source among one or more sound sources determined by the locating, determining a sound signal emitted from a designated sound source among sound signals collected by the terminal according to a spatial position of the designated sound source acquired by the locating, and optimizing the sound signal emitted from the designated sound source. Thus, when collecting sound signals, the terminal selects the surrounding sound sources and optimizes the sound signal emitted from the selected sound source, in this way, the effect of collecting the sound signal by the terminal is improved.

Figure 2:
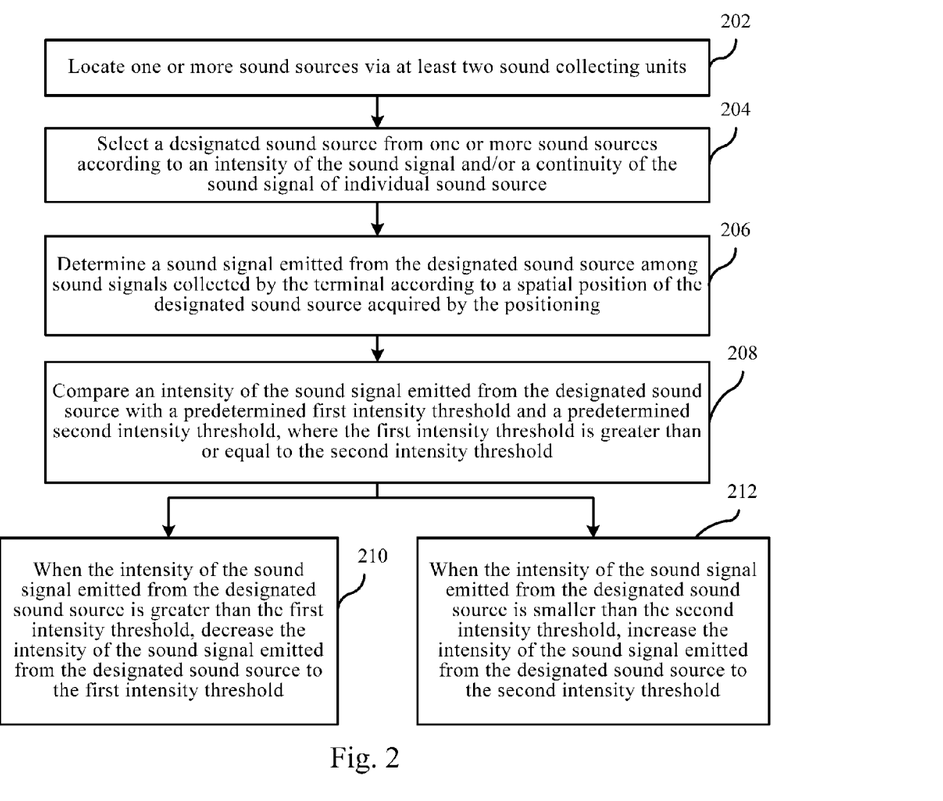
FIG. 2 is an example flow chart of a method of optimizing a sound signal, according to another exemplary embodiment of the present disclosure.

FIG. 2 is a flow chart of a method of optimizing a sound signal, according to another exemplary embodiment of the present disclosure. The method of optimizing a sound signal may be implemented at least partially in a terminal including at least two sound collecting units, and the terminal may be a smart terminal supporting voice communication or a sound recording function, such as a smartphone, a tablet, an e-book reader, and a smart recording pen. As shown in FIG. 2, the method of optimizing a sound signal may include the following steps.

In step 202, one or more sound sources are located via the at least two sound collecting units. The one or more sound sources may include one or more persons speaking around a terminal in a conference room. The one or more sound sources may include one person holding the terminal walking in a public area.

Figure 3:
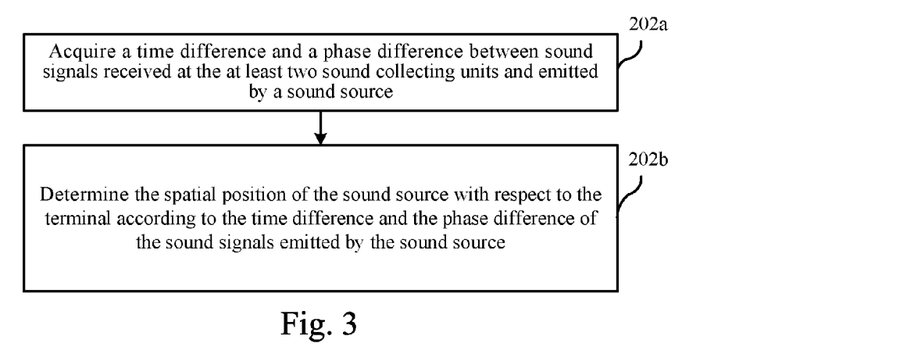
FIG. 3 is an example flow chart of a locating method, according to another exemplary embodiment of the present disclosure.

Alternatively or additionally, referring to the flow chart of the locating method shown in FIG. 3, the step of locating sound sources around the terminal via the at least two sound collecting units may include the following steps.

In step 202a, the terminal acquires a time difference and a phase difference between sound signals received at the at least two sound collecting units and emitted by a sound source. The sound signals are emitted by a sound source arriving at the at least two sound collecting units during a same time period.

The at least two sound collecting units included in the terminal consist one sound collecting unit array. Since distances and directions from the sound source to one or more sound collecting units in the sound collecting unit array are different from each other, the time and phases at which the sound emitted by the sound source is transferred to one or more sound collecting units are different. The terminal may acquire a time difference and a phase difference of the sound emitted by the same sound source, which are collected by one or more sound collecting units in the sound collecting unit array.

In step 202b, the terminal determines the spatial position of the sound source with respect to the terminal according to the time difference and the phase difference of the sound signals emitted by the sound source. For example, the spatial position of the sound source with respect to the terminal may be determined according to the time difference and the phase difference of the sound signals emitted by the sound source and arriving at the at least two sound collecting units during the same time.

The terminal may locate a position of the sound source by utilizing a beam forming technology. For example, the terminal may select the position of the sound source relative to the terminal by the algorithms such as a delay-and-sum or an eigenvalue decomposition, according to the time difference and the phase difference of the sound signal emitted by the sound source arriving at the at least two sound collecting units.

By utilizing the beam forming technology, the terminal may not only locate a spatial position of a fixed sound source accurately, but also track a moving sound source, such that the signal emitted by the moving sound source may be optimized continuously.

In step 204, the designated sound source is selected from one or more sound sources according to an intensity and/or a continuity of each of the sound signals from the one or more sound source. The intensity of each of the sound signals may be measured by the peak value of mean value of the sound signals.

In a call state or a recording state of the terminal, generally, only the sound signal emitted when the user speaks is an effective sound signal, and other sound signals are mostly the noise. In the solution illustrated by the embodiments in the present disclosure, the terminal may select the sound source which is mostly likely the user from one or more sound sources according to an intensity of the sound signal and/or a continuity of each of the sound signals from the one or more sound sources, then only optimize the selected sound source which is mostly likely the user.

For instance, the terminal sets different weights for different intensities of the sound signal, and also sets different weights for different time durations of the sound signal. When receiving a sound signal emitted by one sound source, the terminal determines a weight corresponding to a sound intensity of this sound signal and a weight corresponding to a time duration of this sound signal and performs a weighting calculation to them, then ranks one or more sound sources according to their corresponding weightings, so as to determine the designated sound source having the highest weighting.

Alternatively or additionally, when setting different weights for different intensities of the sound signal, the intensity of the sound which is nearest to people speaking may be set to a relatively high weight, and the greater the difference between the intensity of people talking and that of a sound signal is, the lower the set weight of this sound signal is. For example, the normal sound intensity of people talking is about 40 decibels, then 40 decibels may be set to have the highest weighting, and the greater the distance of a sound intensity from 40 decibels is, the lower the weight of this sound intensity is.

Similarly, when setting different weights for the time durations of the sound signal, the time duration of a sound signal which is nearest to people speaking may be set to a relatively high weight, and the greater the difference between the time duration of the sound signal when people speaks and that of a sound signal is, the lower the set weight of this sound signal is. For example, when people speaks, the time duration of one normal sentence may be 2 s, then the time duration of 2 s may be set to have the highest weighting, and the greater the distance of a time duration of a sound intensity from 2 s is, the lower the weight of this sound intensity is.

Since during recording or call, generally there is only one or two users speaking at the same time, in order to avoid unnecessary optimizing process to overmuch sound sources and to reduce complexity of the optimizing process, the number of the designated sound sources to be screened out at the same time may be set. For example, at most three designated sound sources may be screened out at the same time, and subsequently, optimization is performed to the sound signals emitted by the at most three sound sources at the same time.

In step 206, a sound signal emitted from a designated sound source is determined from sound signals collected by the terminal according to a spatial position of the designated sound source acquired by the locating.

When processing the received sound signal, the terminal may only process the sound signal emitted from the designated sound source according to a spatial position of the designated sound source.

In step 208, an intensity of the sound signal emitted from the designated sound source is compared with a predetermined first intensity threshold and a predetermined second intensity threshold, where the first intensity threshold is greater than or equal to the second intensity threshold.

In step 210, if the intensity of the sound signal emitted from the designated sound source is greater than the first intensity threshold, the intensity of the sound signal emitted from the designated sound source is decreased to the first intensity threshold.

In step 212, if the intensity of the sound signal emitted from the designated sound source is smaller than the second intensity threshold, the intensity of the sound signal emitted from the designated sound source is increased to the second intensity threshold.

Alternatively or additionally, if the intensity of the sound signal emitted from the designated sound source is not smaller than the first intensity threshold and is not greater the second intensity threshold, no process is performed to the intensity of the sound signal emitted by the designated sound source.

The terminal may set the first and second intensity thresholds according to the intensity of the sound signal when people normally speak. If the intensity of the sound signal of the designated sound source is relatively large, the intensity of the designated sound source is decreased; if the intensity of the sound signal of the designated sound source is relatively small, the intensity of the designated sound source is increased; and if the intensity of the sound signal of the designated sound source is moderate, the intensity of the designated sound source is not processed. In this way, the intensity of the sound signal emitted by the designated sound source (which may be the user) may be maintained within a predefined range, not too high and not too low, such that the effect of recording or call attains to the best.

For example, a user A and a user B conduct a teleconferencing via smart phones or conduct a teleconference recording via phones. When the smart phone is controlled to enter into a recording status or a call state, the smart phone is switched to a conference recording mode. At this time, the smart phone collects ambient sound via at least two microphones and determines positions of one or more sound sources. When the user A or the user B is speaking, the smart phone screens out the speaker as the designated sound source and optimizes the sound signal emitted by the speaker. When the intensity of the sound signal emitted by the speaker is smaller than 30 decibels, the intensity of the sound signal emitted by the speaker is improved to 30 decibels; when the intensity of the sound signal emitted by the speaker is greater than 50 decibels, the intensity of the sound signal emitted by the speaker is reduced to 50 decibels; and for the sound signal between 30 decibels and 50 decibels, no process is performed. In this way, the speaking volumes of the users having different distances from the smart phone, which are recorded or listened by the remote end, are ensured to be within a proper range, thereby guaranteeing the recording effect or teleconference communication.

Accordingly, the method may adjust the intensity of the sound signal emitted from the designated sound source to be located between the predetermined two intensity thresholds. In this way, the intensity of the sound signal emitted from the designated sound source which is collected by the terminal is adjusted to a proper range, thereby when the terminal is recording or calling, the effect of collecting the sound signal is improved.

Figure 4:
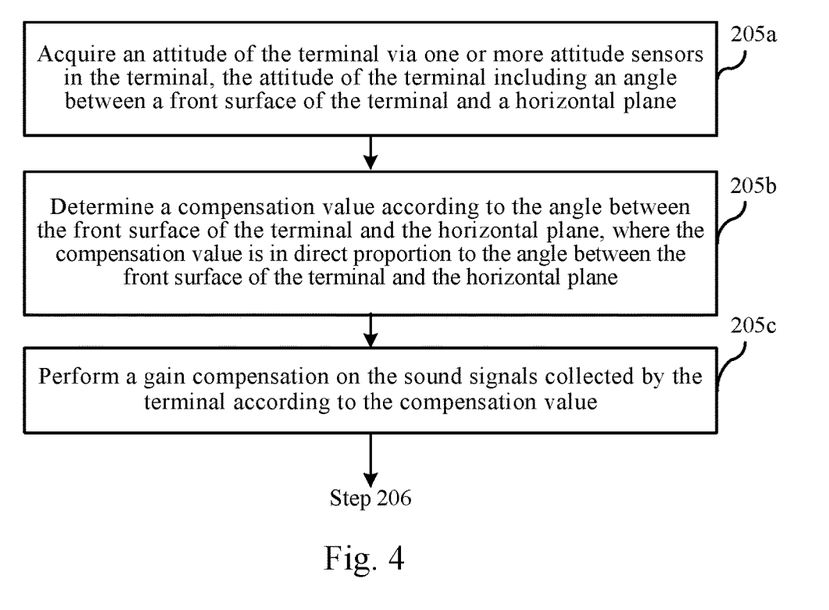
FIG. 4 is an example flow chart of a method of compensating a gain, according to another exemplary embodiment of the present disclosure.

As another optional embodiment, before performing the step 206 in the embodiment shown in FIG. 2, steps 205a-205c in the flow chart of a method of compensating a gain shown in FIG. 4 may be also performed.

In step 205a, a terminal acquires an attitude of the terminal via one or more attitude sensors in the terminal, where the attitude of the terminal includes an angle between a front surface of the terminal and a horizontal plane. The attitude may include other information of the terminal.

In normal conditions, when recording sound or performing a teleconference, the terminal is placed on a table with a front surface upward; while in certain conditions, the attitude of the terminal may be not horizontal, for example, when the terminal is put on a book or other objects, the front surface thereof is not in a horizontal state, at this time, there is a certain angle between the front surface of the terminal and a horizontal plane, which results in a deviation between the sound signal collected by the terminal and that in an ideal state, and the sound signal collected by the terminal with the front surface not in a horizontal state is relatively small compared with the sound signal collected by the terminal with the front surface in the horizontal state.

For this, before determining the sound signal emitted by the designated sound source among the collected sound signals and performing an optimizing process to the determined sound signal, some compensation may be performed to the collected sound signals according to the current attitude of the terminal.

In step 205b, the terminal determines a compensation value according to an angle between a front surface of the terminal and a horizontal plane, where the compensation value is in direct proportion to the angle between the front surface of the terminal and the horizontal plane. For instance, the compensation value increases when the angle between the front surface of the terminal and the horizontal plane increases.

The greater the angle between the front surface of the terminal and the horizontal plane is, the greater the deviation between the sound signal collected by the terminal and that in an ideal state (i.e., the front surface of the terminal is in the horizontal state) is. Thereby, the terminal may calculate a compensation value via a preset algorithm, or inquire a value needing to be compensated via a pre-stored corresponding relationship according to the angle between the front surface of the terminal and the horizontal plane.

In step 205c, the terminal performs a gain compensation on the sound signals collected by the terminal according to the compensation value.

After determining the compensation value, a gain compensation may be performed on all the sound signals collected by the terminal. Alternatively, the terminal may perform gain compensation on selected sound signals. For example, the terminal may only perform gain compensations on sound signals from human beings if the terminal is in a conference recording mode.

When determining the sound signal emitted by the designated sound source from the sound signals collected by the terminal, the terminal may determine the sound signal emitted by the designated sound source from the sound signals after the gain compensation.

Accordingly, in the method provided by embodiments of the present disclosure, by acquiring an attitude of the terminal before determining the sound signal emitted by the designated sound source from the sound signals collected by the terminal and performing the optimization, and performing the gain compensation on the sound signals collected by the terminal according to the attitude of the terminal, the effect of collecting the sound signal when the terminal is recording or calling is further improved.

Embodiments of devices of the present disclosure are described hereinafter, which may be used for performing embodiments of methods of the present disclosure. For the details not described in the embodiments of devices of the present disclosure, please refer to the embodiments of methods of the present disclosure.

Figure 5:
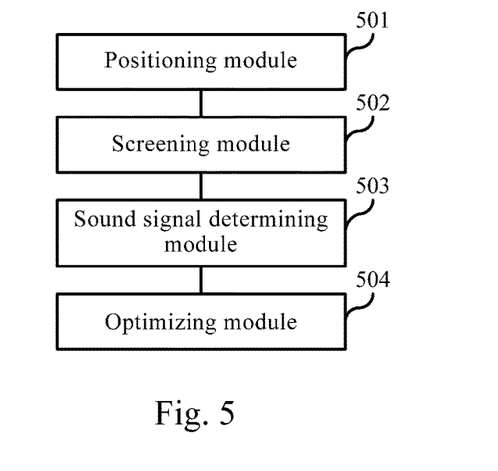
FIG. 5 is an example block diagram of a device of optimizing a sound signal, according to one exemplary embodiment of the present disclosure.

FIG. 5 is a block diagram of a device of optimizing a sound signal, according to one exemplary embodiment of the present disclosure. The device of optimizing a sound signal may be implemented at least partially in a terminal including at least two sound collecting units. The terminal may be a smart terminal supporting voice communication or a sound recording function, such as a smartphone, a tablet, an e-book reader, and a smart recording pen, for performing the method shown in any of FIGS. 1-4. As shown in FIG. 5, the device of optimizing a sound signal includes, but is not limited to, a locating module 501, a screening module 502, a sound signal determining module 503 and an optimizing module 504.

The locating module 501 is configured to locate one or more sound sources via at least two sound collecting units, where the sound sources may be around a terminal.

The screening module 502 is configured to select a designated sound source among one or more sound sources determined by the locating.

The sound signal determining module 503 is configured to determine a sound signal emitted from the designated sound source among sound signals collected by the terminal according to a spatial position of the designated sound source acquired by the locating.

The optimizing module 504 is configured to optimize the sound signal emitted from the designated sound source.

Accordingly, the device optimizes a sound signal by locating sound sources around the terminal via at least two sound collecting units, selecting a designated sound source among one or more sound sources determined by the locating, determining a sound signal emitted from the designated sound source among sound signals collected by the terminal according to a spatial position of the designated sound source acquired by the locating, and optimizing the sound signal emitted from the designated sound source. Thus, when collecting sound signals, the terminal screens out the surrounding sound sources and optimizes the sound signal emitted from the screened sound source, in this way, the effect of collecting the sound signal by the terminal is improved.

Figure 6:
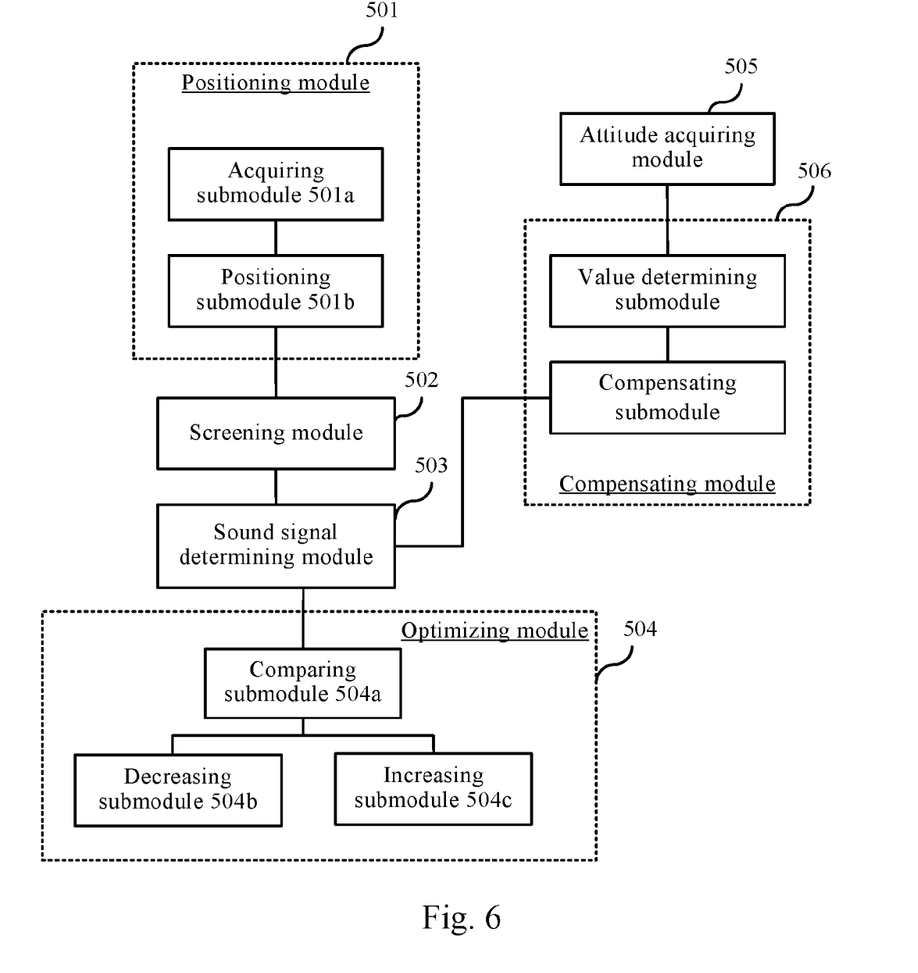
FIG. 6 is an example block diagram of a device of optimizing a sound signal, according to another exemplary embodiment of the present disclosure.

FIG. 6 is a block diagram of a device of optimizing a sound signal, according to one exemplary embodiment of the present disclosure. The device of optimizing a sound signal may be included in a terminal including at least two sound collecting units. The terminal may be a smart terminal supporting voice communication or a sound recording function, such as a smartphone, a tablet, an e-book reader, and a smart recording pen, for performing the method shown in any of FIGS. 1-4. As shown in FIG. 6, the device of optimizing a sound signal includes, but is not limited to, a locating module 501, a screening module 502, a sound signal determining module 503 and an optimizing module 504.

The locating module 501 is configured to locate one or more sound sources via at least two sound collecting units. The sound sources may be around a terminal.

The screening module 502 is configured to select a designated sound source among one or more sound sources determined by the locating.

The sound signal determining module 503 is configured to determine a sound signal emitted from the designated sound source among sound signals collected by the terminal according to a spatial position of the designated sound source acquired by the locating.

The optimizing module 504 is configured to optimize the sound signal emitted from the designated sound source.

Alternatively or additionally, the optimizing module 504 includes a comparing submodule 504a, a decreasing submodule 504b and an increasing submodule 504c.

The comparing submodule 504a is configured to compare an intensity of the sound signal emitted from the designated sound source with a predetermined first intensity threshold and a predetermined second intensity threshold, the first intensity threshold being greater than or equal to the second intensity threshold.

The decreasing submodule 504b is configured to, if the intensity of the sound signal emitted from the designated sound source is greater than the first intensity threshold, decrease the intensity of the sound signal emitted from the designated sound source to the first intensity threshold.

The increasing submodule 504c is configured to, if the intensity of the sound signal emitted from the designated sound source is smaller than the second intensity threshold, increase the intensity of the sound signal emitted from the designated sound source to the second intensity threshold.

Alternatively or additionally, the locating module 501 includes: an acquiring submodule 501a and a locating submodule 501b.

The acquiring submodule 501a is configured to acquire a time difference and a phase difference of sound signals received at the at least two sound collecting units and emitted by a sound source.

The locating submodule 501b is configured to determine the spatial position of the sound source with respect to the terminal according to the time difference and the phase difference of the sound signal emitted by the sound source arriving at the at least two sound collecting units.

Alternatively or additionally, the screening module 502 is configured to screen out the designated sound source among one or more sound sources according to an intensity and/or a continuity of the sound signal of one or more sound sources.

Alternatively or additionally, the device further includes: an attitude acquiring module 505 and a compensating module 506.

The attitude acquiring module 505 is configured to acquire an attitude of the terminal via one or more attitude sensors in the terminal before the sound signal determining module 503 determines the sound signal emitted from the designated sound source among the sound signals collected by the terminal.

The compensating module 506 is configured to perform a gain compensation on the sound signals collected by the terminal according to the attitude of the terminal.

The sound signal determining module 503 is configured to determine the sound signal emitted from the designated sound source among the sound signals having undergone the gain compensation.

Alternatively or additionally, the compensating module 506 includes: a value determining submodule 506a and a compensating submodule 506b.

The value determining submodule 506a is configured to determine a compensation value according to an angle between a front surface of the terminal and a horizontal plane, the angle between the front surface of the terminal and the horizontal plane being in direct proportion to the compensation value.

The compensating submodule 506b is configured to perform the gain compensation on the sound signals collected by the terminal according to the compensation value.

The attitude of the terminal includes the angle between the front surface of the terminal and the horizontal plane.

Here, all modules and submodules may be implemented using circuitries including in the device of optimizing a sound signal provided by embodiments of the present disclosure, sound sources around the terminal are located via at least two sound collecting units, a designated sound source is screened out among one or more sound sources determined by the locating, a sound signal emitted from a designated sound source is determined among sound signals collected by the terminal according to a spatial position of the designated sound source acquired by the locating, and the intensity of the sound signal emitted from the designated sound source is adjusted to be located between the predetermined two intensity thresholds, in this way, the intensity of the sound signal emitted from the designated sound source which is collected by the terminal is adjusted to a proper range, thereby when the terminal is recording or calling, the effect of collecting the sound signal is improved.

Moreover, in the device provided by embodiments of the present disclosure, by acquiring the attitude of the terminal before determining the sound signal emitted by the designated sound source from the sound signals collected by the terminal and performing the optimization, and performing the gain compensation on the sound signals collected by the terminal according to the attitude of the terminal, the effect of collecting the sound signal when the terminal is recording or calling is further improved.

Figure 7:
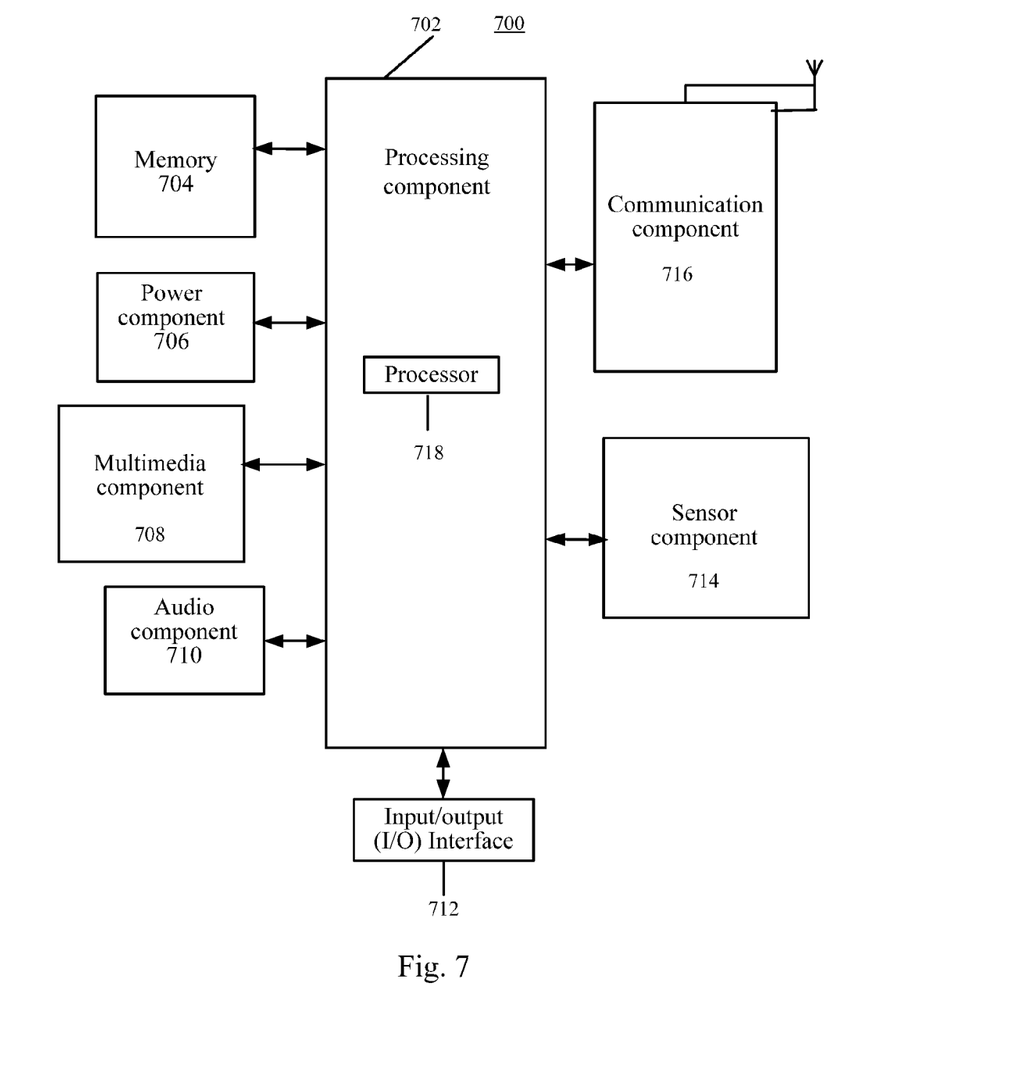
FIG. 7 is an example block diagram of a device, according to one exemplary embodiment of the present disclosure.

FIG. 7 is a block diagram of a device 700, according to one exemplary embodiment of the present disclosure. The device includes at least two sound collecting units. For example, the device 800 may be a mobile phone, a computer, a digital broadcast terminal, a messaging device, a routing device, a gaming console, a tablet, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 718 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. Moreover, the memory 704 stores one or more modules which are configured to be executed by the one or more processor 718, so as to perform all or part of the steps in the methods shown in any of FIGS. 1-4.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative locating of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more processing circuitry including application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. Each module discussed above, such as the locating module 501, the screening module 502, the sound signal determining module 503 and the optimizing module 504, may take the form of a packaged functional hardware unit designed for use with other components, a portion of a program code (e.g., software or firmware) executable by the processor 718 or the processing circuitry that usually performs a particular function of related functions, or a self-contained hardware or software component that interfaces with a larger system, for example.

In exemplary embodiments, there is also provided a non-transitory computer readable storage medium including instructions, such as included in the memory 704, executable by the processor 718 in the device 700, for performing the above-described methods. For example, the non-transitory computer-readable storage medium may be a ROM, a RAM, a CD-ROM, a magnetic tape, a floppy disc, an optical data storage device, and the like.

With respect to the devices in the above embodiments, the specific manners for performing operations for individual modules therein have been described in detail in the embodiments regarding the methods, which will not be elaborated herein.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method of optimizing a sound signal, comprising:
    locating, by a terminal including at least two sound collecting units, one or more sound sources via the at least two sound collecting units;
    acquiring an attitude of the terminal via one or more attitude sensors in the terminal and performing a gain compensation on sound signals collected by the terminal according to the attitude of the terminal, wherein the gain compensation is performed on a sound signal that is identified by using the attitude of the terminal, wherein the attitude comprises an angle between a front surface of the terminal and a horizontal plane, and a compensation value increases when the angle between the front surface of the terminal and the horizontal plane increases, and removing a background noise at the same time when the gain compensation is performed wherein the background noise is identified by using the attitude, wherein the sound signal is identified as an effective sound signal not the background noise based on: setting different weights for different intensities of the sound signal, and setting different weights for different time durations of the sound signal;
    ranking the one or more sound sources according to their corresponding weightings and selecting a designated sound source having the highest weighting among the one or more sound sources;
    determining a spatial position of the designated sound source and determining the sound signal emitted from the designated sound source among the sound signals collected by the terminal according to the spatial position; and
    optimizing the sound signal emitted from the designated sound source.

2. The method according to claim 1, wherein optimizing the sound signal emitted from the designated sound source comprises:
    comparing an intensity of the sound signal emitted from the designated sound source with a predetermined first intensity threshold and a predetermined second intensity threshold, the first intensity threshold being greater than or equal to the second intensity threshold;
    when the intensity of the sound signal emitted from the designated sound source is greater than the first intensity threshold, decreasing the intensity of the sound signal emitted from the designated sound source to the first intensity threshold; and
    when the intensity of the sound signal emitted from the designated sound source is smaller than the second intensity threshold, increasing the intensity of the sound signal emitted from the designated sound source to the second intensity threshold.

3. The method according to claim 1, wherein locating the sound sources via the at least two sound collecting units comprises:
    acquiring a time difference and a phase difference between sound signals received at the at least two sound collecting units and emitted by a sound source; and
    determining the spatial position of the sound source with respect to the terminal according to the time difference and the phase difference of the sound signals emitted by the sound source.

4. The method according to claim 1, wherein selecting the designated sound source among the one or more sound sources comprises: selecting the designated sound source among the one or more sound sources according to at least one of: an intensity and a continuity of the sound signals from the one or more sound sources.

5. The method according to claim 1, further comprising: determining the sound signal emitted from the designated sound source among the sound signals having undergone the gain compensation.

6. The method according to claim 5, further comprising:
determining the compensation value according to the angle between the front surface of the terminal and the horizontal plane, wherein the compensation value is in direct proportion to the angle between the front surface of the terminal and the horizontal plane; and
performing the gain compensation on the sound signals collected by the terminal according to the compensation value.

7. A device of optimizing a sound signal, comprising:
a processor electronically connected to at least two sound collecting units; and
a memory for storing instructions executable by the processor;
wherein the processor is configured to:
locate one or more sound sources via the at least two sound collecting units;
acquire an attitude of the device via one or more attitude sensors in the device and perform a gain compensation on sound signals collected by the device according to the attitude of the device, wherein the gain compensation is performed on a sound signal that is identified by using the attitude of the device, wherein the attitude comprises an angle between a front surface of the device and a horizontal plane, and a compensation value increases when the angle between the front surface of the device and the horizontal plane increases, and remove a background noise at the same time when the gain compensation is performed wherein the background noise is identified by using the attitude, wherein the sound signal is identified as an effective sound signal not the background noise based on: setting different weights for different intensities of the sound signal, and setting different weights for different time durations of the sound signal;
rank the one or more sound sources according to their corresponding weightings and select a designated sound source having the highest weighting among the one or more sound sources;
determine a spatial position of the designated sound source and determine the sound signal emitted from the designated sound source among the sound signals collected by the sound collecting units according to the spatial position; and
optimize the sound signal emitted from the designated sound source.

8. The device according to claim 7, wherein the processor is further configured to:
compare an intensity of the sound signal emitted from the designated sound source with a predetermined first intensity threshold and a predetermined second intensity threshold, the first intensity threshold being greater than or equal to the second intensity threshold;
when the intensity of the sound signal emitted from the designated sound source is greater than the first intensity threshold, decrease the intensity of the sound signal emitted from the designated sound source to the first intensity threshold; and
when the intensity of the sound signal emitted from the designated sound source is smaller than the second intensity threshold, increase the intensity of the sound signal emitted from the designated sound source to the second intensity threshold.

9. The device according to claim 7, wherein the processor is further configured to:
receive sound signals, emitted by a sound source, at the at least two sound collecting units;
acquire a time difference and a phase difference between the sound signals received at the at least two sound collecting units; and
determine the spatial position of the sound source with respect to the device according to the time difference and the phase difference of the sound signals.

10. The device according to claim 7, wherein the processor is further configured to select the designated sound source among one or more sound sources according to at least one of the following: an intensity and a continuity of each of the sound signals from the one or more sound sources.

11. The device according to claim 7, wherein the processor is further configured to: determine the sound signal emitted from the designated sound source among the sound signals having undergone the gain compensation.

12. The device according to claim 11, wherein the processor is further configured to:
determine the compensation value according to the angle between the front surface of the device and the horizontal plane, wherein the compensation value is in direct proportion to the angle between the front surface of the device; and
perform the gain compensation on the sound signals collected by the device according to the compensation value,
wherein the attitude of the device comprises the angle between the front surface of the device and the horizontal plane.

13. A non-transitory readable storage medium comprising instructions, executable by a processor in a terminal, for performing acts comprising:
locating one or more sound sources around the terminal via the at least two sound collecting units;
acquiring an attitude of the terminal via one or more attitude sensors in the terminal and performing a gain compensation on sound signals collected by the terminal according to the attitude of the terminal, wherein the gain compensation is performed on a sound signal that is identified by using the attitude of the terminal, wherein the attitude comprises an angle between a front surface of the terminal and a horizontal plane, and a compensation value increases when the angle between the front surface of the terminal and the horizontal plane increases, removing a background noise at the same time when the gain compensation is performed wherein the background noise is identified by using the attitude, wherein the sound signal is identified as an effective sound signal not the background noise based on: setting different weights for different intensities of the sound signal, and setting different weights for different time durations of the sound signal;
ranking the one or more sound sources according to their corresponding weightings and selecting a designated sound source having the highest weighting among one or more sound sources determined;
determining a spatial position of the designated sound source and determining the sound signal emitted from the designated sound source among the sound signals collected by the terminal according to the spatial position; and optimizing the sound signal emitted from the designated sound source.

14. The non-transitory readable storage medium according to claim 13, wherein the acts further comprise:

comparing an intensity of the sound signal emitted from the designated sound source with a predetermined first intensity threshold and a predetermined second intensity threshold, the first intensity threshold being greater than or equal to the second intensity threshold;

when the intensity of the sound signal emitted from the designated sound source is greater than the first intensity threshold, decreasing the intensity of the sound signal emitted from the designated sound source to the first intensity threshold; and when the intensity of the sound signal emitted from the designated sound source is smaller than the second intensity threshold, increasing the intensity of the sound signal emitted from the designated sound source to the second intensity threshold.

15. The non-transitory readable storage medium according to claim 13, wherein the acts further comprise:

acquiring a time difference and a phase difference between sound signals received at the at least two sound collecting units and emitted by a sound source; and determining the spatial position of the sound source with respect to the terminal according to the time difference and the phase difference of the sound signals emitted by the sound source.

16. The non-transitory readable storage medium according to claim 13, wherein the acts further comprise:

selecting the designated sound source among the one or more sound sources according to at least one of: an intensity and a continuity of each of the sound signals from the one or more sound sources.

17. The non-transitory readable storage medium according to claim 13, wherein the acts further comprise:

determining the sound signal emitted from the designated sound source among the sound signals having undergone the gain compensation.

18. The non-transitory readable storage medium according to claim 17, wherein the acts further comprise:

determining the compensation value according to the angle between the front surface of the terminal and the horizontal plane, wherein the compensation value is in direct proportion to the angle between the front surface of the terminal and the horizontal plane; and performing the gain compensation on the sound signals collected by the terminal according to the compensation value.

\* \* \* \* \*